(12) United States Patent
Klappenbach et al.

(10) Patent No.: US 7,262,529 B2
(45) Date of Patent: Aug. 28, 2007

(54) CONNECTING ELEMENT FOR A WINDING OF AN ELECTRIC MACHINE

(75) Inventors: Christoph Klappenbach, Ottersweier-Unzhurst (DE); Erik Maurer, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 10/521,405

(22) PCT Filed: May 30, 2003

(86) PCT No.: PCT/DE03/01768

§ 371 (c)(1),
(2), (4) Date: Jan. 18, 2005

(87) PCT Pub. No.: WO2004/062066

PCT Pub. Date: Jul. 22, 2004

(65) Prior Publication Data
US 2006/0091745 A1 May 4, 2006

(30) Foreign Application Priority Data
Dec. 27, 2002 (DE) ................. 102 61 611

(51) Int. Cl.
*H02K 11/00* (2006.01)
(52) U.S. Cl. .................................... 310/71
(58) Field of Classification Search ............... 310/71, 310/260
See application file for complete search history.

(56) References Cited

U.S. PATENT DOCUMENTS 3,979,615 A 9/1976 Neff
3,984,712 A 10/1976 Hill
4,315,179 A 2/1982 Davey
5,828,147 A 10/1998 Best et al.
5,900,687 A 5/1999 Kondo et al.
6,300,697 B1 10/2001 Findeisen et al.
6,600,244 B2 * 7/2003 Okazaki et al. ............... 310/71
6,938,816 B2 9/2005 Tominaga et al.
2003/0234278 A1 12/2003 Tominaga et al.

FOREIGN PATENT DOCUMENTS

| DE | 43 39 384 | 5/1995 |
|---|---|---|
| DE | 698 00 298 | 1/2001 |
| EP | 0 777 312 A | 6/1997 |
| EP | 1 062 720 | 12/2000 |
| JP | 2001309600 | 11/2001 |
| JP | 2004025198 | 1/2004 |
| WO | 02/061919 A2 | 8/2002 |

* cited by examiner

Primary Examiner—Dang Le
(74) Attorney, Agent, or Firm—Michael J. Stricker

(57) ABSTRACT

An interconnection element for a multi-phase winding (11) that is made up of coils (12) and belongs to an electric machine, in particular a brushless mini motor, having a support (20) made of insulating material and conducting strips that are disposed on the support (20) for producing interconnections among the coils (12). In order to reduce materials costs, the conducting strips are embodied in the form of bent wires (27-30) that are preferably contained in channels embodied in the support (20) and are fixed in place by means of two annular cover elements (31, 32) made of insulating material.

13 Claims, 3 Drawing Sheets

CONNECTING ELEMENT FOR A WINDING OF AN ELECTRIC MACHINE

CROSS-REFERENCE

The invention described and claimed hereinbelow is also described in PCT/DE03/01768, filed on May 30, 2003 and DE 102 61 611.6, filed Dec. 27, 2002. This German Patent Application, whose subject matter is incorporated here by reference, provides the basis for a claim of priority of invention under 35 U.S.C. 119 (a)-(d).

BACKGROUND OF THE INVENTION

The invention is based on an interconnection element for a multiphase winding that is comprised of coils and is part of an electrical machine, in particular a brushless mini motor.

In a known interconnection element of this type (EP 1 062 720 B1), the support made of insulating material is embodied in the form of a supporting plate, which, together with a stator body that is embodied in the form of a lamination bundle and supports the winding, is fastened by means of a hub to a bearing support tube that is in turn attached to a motor flange. The electrical conducting strips for producing interconnections among the coils are embodied as conductor rails that are manufactured as stamped parts and are fastened to the supporting plate, concentric to the hub. A first conductor rail, which has tabs extending at angles in relation to the conductor rail to form a star point, is connected to the coil ends of all of the winding phases. Three other conductor rails are attached to the supporting plate, arranged concentrically around the first conductor rail, their tabs arrayed for connection to the coil beginnings. In order to avoid crossing points between the concentric rails and the tabs protruding from them, the tabs of the second conductor rail are routed under the third conductor rail and the fourth conductor rail by means of sunken guides in the supporting plate and the tabs of the third conductor rail are also routed under the fourth conductor rail by means of sunken guides. When manufacturing the conductor rails that are comprised of stamped material, in order to keep waste within limits, the first and third conductor rails are manufactured in a first stamping die and the second and fourth conductor rails are manufactured in a second stamping die, each in its own stamping procedure, the second, third, and fourth conductor rails each being provided with a connecting tab for litz-connections.

ADVANTAGES OF THE INVENTION

The interconnection element according to the present invention has the advantage that using bent wires for the electric conducting strips achieves a drastic reduction in the metal-related material costs for the interconnection element since in particular, this eliminates the enormous material waste generated by stamping, which can be up to 80% with the known interconnection element. The material waste is limited solely to the trimming of the wire ends possibly required by the manufacturing process. The substantial elimination of material waste also advantageously reduces disposal costs. Using simple wire-bending—the wires can have a round or polygonal cross section (rectangular, square, hexagonal, etc.)—makes it possible to replace stamping dies with inexpensive bending and handling tools. Plants that do not require a separate stamping station can manufacture the interconnection element according to the present invention by using the simple, inexpensive wire bending process, which can be implemented for only minimal investment costs, thus permitting companies to increase their real net output.

According to an advantageous embodiment form of the present invention, the support is embodied in the form of a circular plastic ring with coaxial channels provided to accommodate the wires, which channels are partly open at the sides and are offset from one another, partly in the radial direction and partly in the axial direction. The circular plastic ring, whose radial width approximately corresponds to the radial thickness of the yoke ring of the stator of the motor, is manufactured as an injection-molded part whose slender annular form further reduces materials costs in comparison to the supporting plate with the known interconnection element.

BRIEF DESCRIPTION OF THE DRAWINGS

The invention will be explained in greater detail in the description below in conjunction with an exemplary embodiment shown in the drawings.

DETAILED DESCRIPTION OF THE PREFERRED EMBODIMENTS

Figure 1:
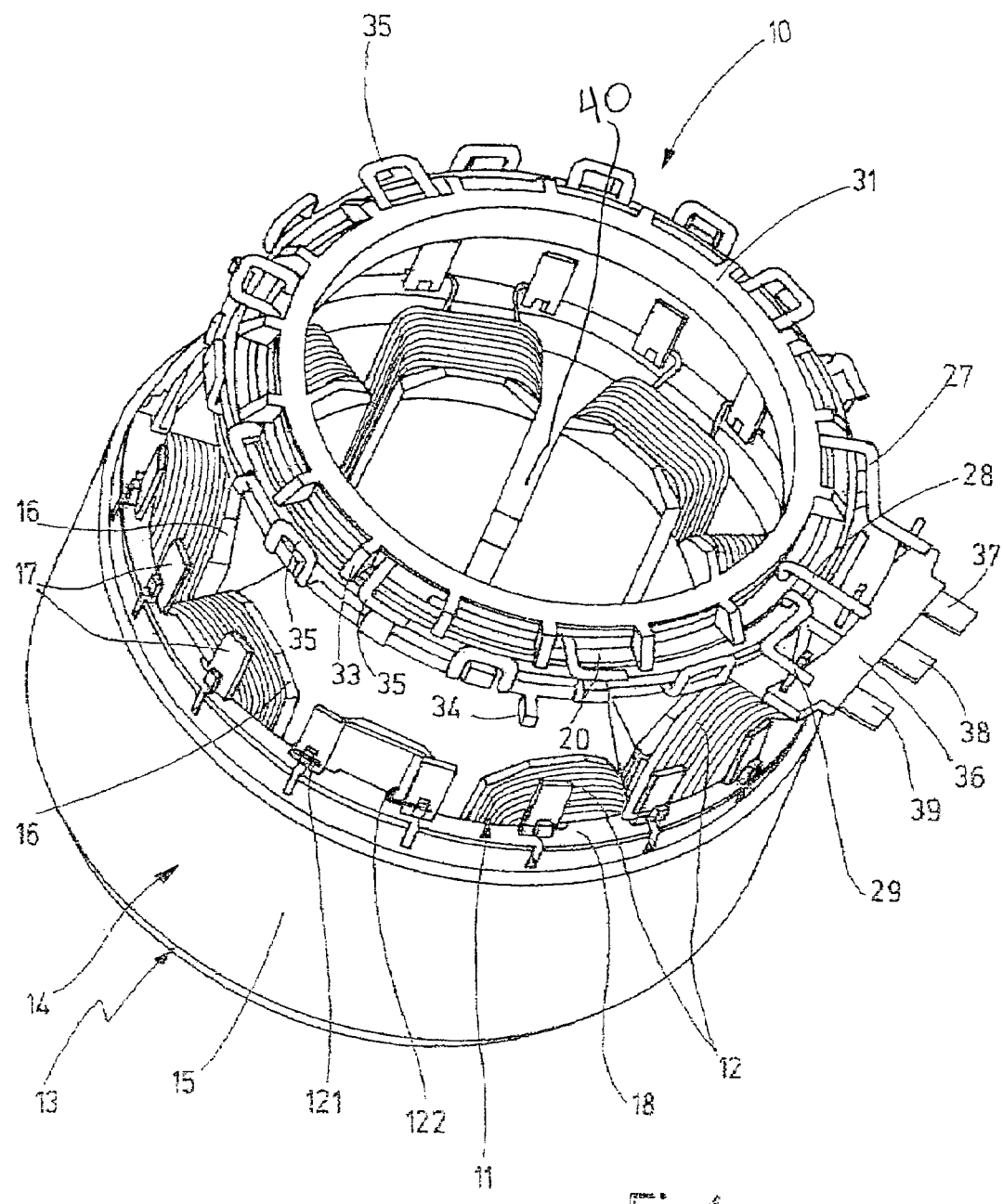
FIG. 1 shows a perspective top view of an interconnection element for a winding in the stator of a brushless mini motor, in association with the stator.

The interconnection element 10 shown in the perspective top view in FIG. 1 is conceived for a three-phase winding 11 with a total of nine coils 12 of a stator 13 of a brushless mini motor, which can be an electronically commutated direct current motor (EC motor) or a synchronous motor. The stator 13 depicted in a perspective view in FIG. 1 has a stator body 14, which, in an intrinsically known way, includes a hollow cylindrical yoke ring 15 and, in the exemplary embodiment, a total of nine stator teeth 16 protruding radially from it, which, with a rotor that is not shown here, delimit the working air gap of the motor. An annular coil 12 is wound onto each stator tooth 16 and the coil ends 121 and 122 of each coil 12 are attached to a respective flat connecting pin 17. The connecting pins 17 are disposed equidistantly in the circumference direction and protrude axially from the end surface of the yoke ring 15; they are electrically insulated from the yoke ring 15 by an insulation ring 18.

The interconnection element 10 is used to produce interconnections among the coils 12; in the example described, the interconnections are laid out so that each phase belt or winding phase of the three-phase winding 11 has three coils 12 connected in parallel.

Figure 2:
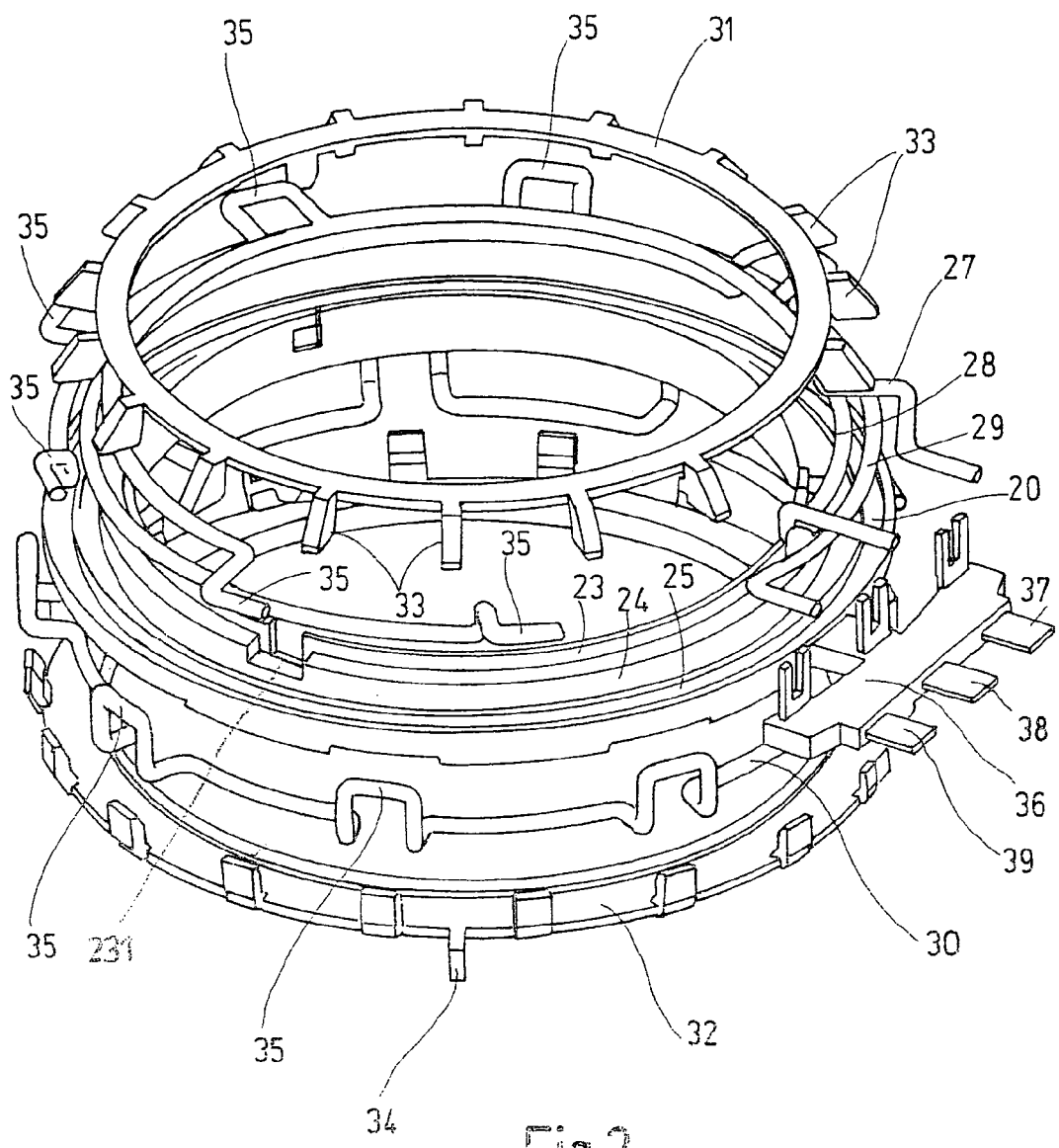
FIG. 2 is a perspective, exploded view of the interconnection element according to FIG. 1.
Figure 3:
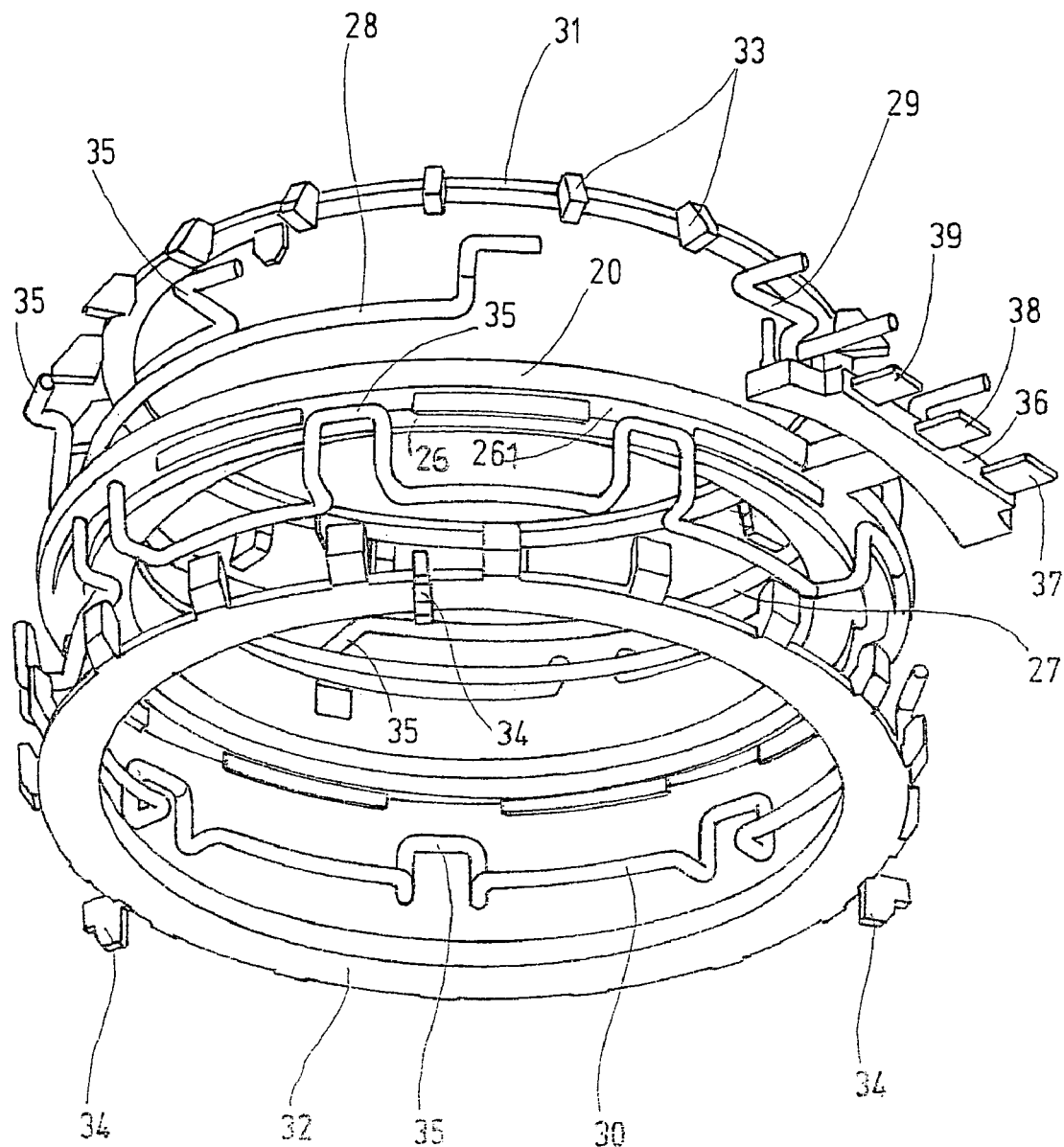
FIG. 3 is a perspective, exploded bottom view of the interconnection element in FIG. 1.

The interconnection element 10, an exploded view of which is shown from above in FIG. 2 and from below in FIG. 3, has an annular support 20 made of plastic that has a total of four coaxial channels 23-26, each for accommodating one of a total of four bent wires 27 through 30 that serve to interconnect the coils 12. Two channels 24 and 26 are radially offset in a plane of the support 20, i.e. are concentric to each other. The upper channel 23 and the lower channel 26 are axially offset in relation to the channels 24, 25 in the shared middle plane of the support 20 and have channel openings 231 and 261 in their outer annular wall. The upper channel 23 is also offset radially inward in relation to the channels 24 and 25. The corresponding bent wires 27 through 30 are accommodated in the channels 23 through 26 and are fixed therein by means of two annular cover elements 31, 32 made of plastic that are placed axially against the support 20 from above and below. The upper cover element 31 closes the upper channel 23 and, with axially downward-protruding closing bodies 33 that project radially beyond the cover element 31, partially covers the two middle channels 24, 25. The lower cover element 32 closes the lower channel 26 with the wire 30 contained therein and has downward-protruding bracing struts 34 disposed offset from one another on its circumference, which, when the interconnection element 10 is placed against the end surface of the yoke ring 15, protrude between the wound stator teeth 16 and rest radially against the inner wall 40 of the yoke ring 15 with frictional, nonpositive engagement. Both of the cover elements 31, 32 are fastened to the support 20, which can be carried out, for example, by means of clips, gluing, or ultrasonic welding.

A terminal strip 36 injection-molded out of plastic is placed against the support 20 and is equipped with three connecting terminals 37, 38, 39, each for one of the winding phases. The wire ends of the wires 27 through 29 are connected electrically and mechanically to the connecting terminals 37 through 39 by means of hot-stacking. In the course of the wires 27 through 30, bent segments 35 are provided, which serve to connect the wires 27 through 30 to the connecting pins 17 of the stator 13. In accordance with the three-phase wiring 11 in which each winding phase has three parallel coils 12, the wires 27 through 29 each have three bent segments 35 and the wire 30 has a total of nine bent segments 35 in order to produce a star point comprised of the winding phases. The bent segments 35 in the wires 28 and 29 that are contained in the two middle channels 24, 25 are routed radially over the channel rims of the channels 24, 25 to the connecting pins 17 and the bent segments 35 in the wires 27 and 30, which are contained in the upper channel 23 and the lower channel 26, are routed out the side through the channel openings 231 and 261 and are then bent axially in order to reach the plane of the connecting pins 17. The electrical connection between the bent segments 35 and the connecting pins 17 is produced by means of welding, soldering, or insulation displacement. In an alternative embodiment form, the connecting pins 17 can be eliminated and the coil ends 121, 122 can be welded directly to the bent segments 35.

The support 20 of the interconnection element 10 can have other attachment possibilities for add-on pieces. The bracing struts 34 simultaneously serve to center the interconnection element 10 in relation to the stator 13. In addition, fixing elements can be provided that automatically produce a correct association of the bent segments 35 with the coil ends 121, 122 of the coil 12 when the interconnection element 10 is placed against the stator 13.

Naturally the above-described interconnection element is not limited solely to the interconnection of a three-phase winding with nine coils. With a corresponding adaptation of the number of bent wires and of the bent segments in the wires for connection to the coils, it is possible to interconnect any winding with any number of phases and coils.

What is claimed is:

1. An interconnection element for a multi-phase winding (11) that is comprised of coils (12) and belongs to an electric machine, in particular a brushless mini motor, having a support (20) made of insulating material and conducting strips that are disposed on the support (20) and are for producing interconnections among the coils (12), wherein the electrical conducting strips are embodied in the form of bent wires (27-30), wherein the wires have a round cross section and are shaped by means of a wire-bending process, wherein in the course of the wires (27-30), bent segments (35) in the form of wire loops are provided, wherein said bent segments in the form of wire loops connect the coil ends (121,122) of the coils (12) of the winding (11), wherein said bent segments in the form of wire loops also are produced by a wire-bending process.

2. The interconnection element as recited in claim 1, wherein the wires (27-30) are contained in concentric channels (23-26), wherein said concentric channels are embodied in the support (20) and are offset from one another, partly in the radial direction, partly in the axial direction.

3. The interconnection element as recited in claim 2, wherein the wires (27-30) are fixed in the channels (23-26) by means of two annular cover elements (31, 32) made of insulating material, wherein said annular cover elements are placed against the top and bottom of the support (20) and affixed to it.

4. The interconnection element as recited in claim 3 wherein the cover element (32) that is placed against the underside of the support (20) is provided with fastening means for spatially fixing it in the machine.

5. The interconnection element as recited in claim 3, wherein an upper channel (23) is covered by the upper cover element (31), a lower channel (26) is covered by the lower cover element (32), and the upper cover element (31) has closing bodies (33), wherein said closing bodies (33) are offset from one another in the circumference direction, protrude axially downward, and rest on two radially offset middle channels (24,25).

6. The interconnection element as recited in claim 5, wherein the upper channel (23) and the lower channel (26) are axially offset in relation to the channels (24, 25) in a common middle plane of the support (20).

7. The interconnection element as recited in claim 2, wherein the support (20) is embodied in the form of a circular plastic ring into which the channels (23-26) are integrally formed.

8. The interconnection element as recited in claim 1, wherein the bent segments (35) are routed out of the channels (23-26), partly by being routed over the channel rims and partly by being routed radially out lateral channel openings (231, 261).

9. The interconnection element as recited in claim 1, wherein the support (20) is provided with a terminal strip (36) that has connecting terminals (37-39), and wherein one wire end of each of the wires (27-29) is attached to a connecting terminal (37-39).

10. A stator for an electric machine, having a stator body (14) and a multi-phase winding (11) that is comprised of coils (12) and is contained in this stator body, characterized by means of an interconnection element (10) as recited in claim 1 that connects the coils (12).

11. The stator as recited in claim 10, wherein the interconnection element (10) is placed against one end surface of the stator body (14) and the fastening means provided on the support (20) are comprised of bracing struts (34) that are disposed offset from one another around the circumference of the support (20) and rest radially against the inner wall of the stator body (14) with a frictional, nonpositive engagement.

12. The stator as recited in claim 10, wherein the coil ends (121, 122) of the coils (12) are placed against connecting pins (17), which protrude axially from the end surface of the stator body (14), and the connecting pins (17) are attached to the bent segments (35) in the wires (27-30) of the interconnection element (10) in an electrically conductive manner by being welded or soldered to them.

13. The stator as recited in claim 1, wherein the coils (12) are embodied in the form of annular coils that are wound onto stator teeth (16), which protrude radially from a yoke ring (15) of the stator body (14).

* * * * *